March 3, 1964 E. KOMENDA 3,123,401
BACKREST CONSTRUCTION
Filed Feb. 1, 1962
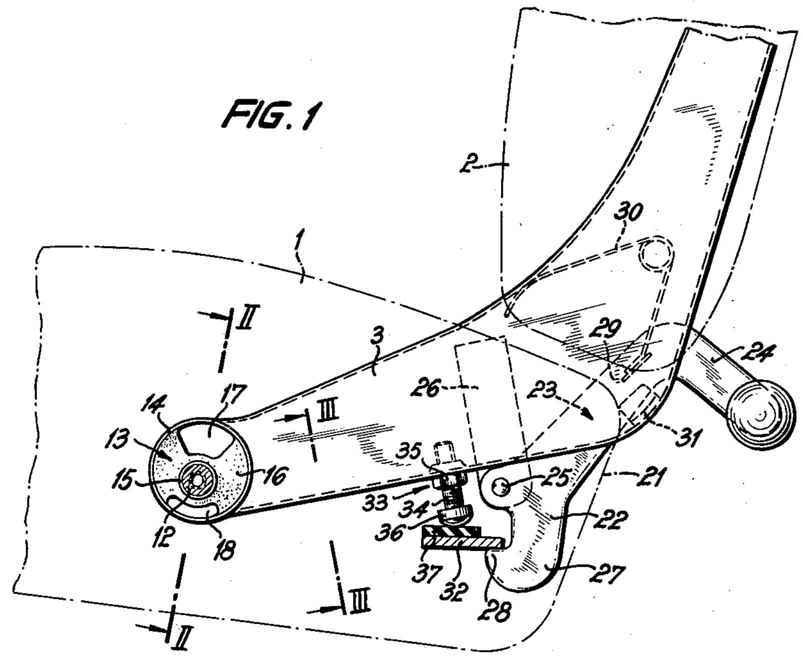
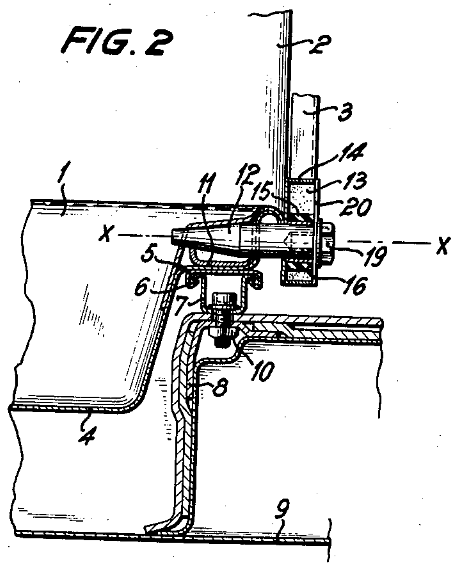
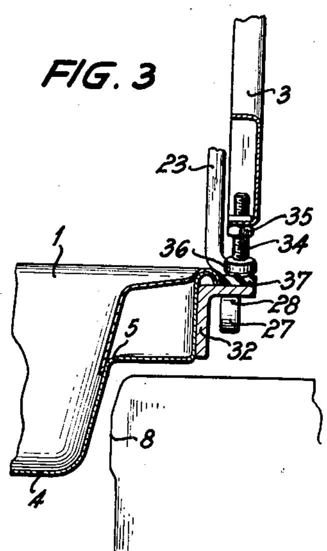
INVENTOR:
ERWIN KOMENDA
BY Dicke and Craig
ATTORNEYS United States Patent Office 3,123,401
Patented Mar. 3, 1964

3,123,401

BACKREST CONSTRUCTION

Erwin Komenda, Stuttgart, Germany, assignor to Firma Dr. Ing. h. c. F. Porsche KG, Stuttgart-Zuffenhausen, Germany Filed Feb. 1, 1962, Ser. No. 170,358
Claims priority, application Germany Mar. 30, 1961
8 Claims. (Cl. 297—379)

The present invention relates to a vehicle seat provided with a foldable or tiltable backrest which is secured against any unintentional forward folding or tilting movement by means of a disengageable locking mechanism.

In order to avoid that passengers seated in the rear or cargo goods stored thereat cause an unintentional forward tilting of the backrests of the front seats upon sudden braking of a motor vehicle by reason of the effect of the inertial forces, it has already been proposed in the prior art to provide locking mechanisms which engage, in the normal position of the backrest, in the metal fittings or fixtures thereof. As a result of the large inertia forces which occur, for example, in case of collision and which become effective on a backrest, the entire seating frame is likely to be warped in most cases as a result thereof whereby permanent deformations occur especially within the area of the hinge axis of the backrest fittings. Any repair of the seat frame is thereby connected with considerable costs.

According to the present invention, these disadvantages are eliminated by supporting the backrest at the seat frame by resilient means which are effective essentially exclusively in the normal position of use of the backrest. As a result thereof, the shocks acting against the backrest are reduced dampingly in such a manner that damages at the seat frame and at the backrest-frame support are avoided. Simultaneously therewith, an increased safety is achieved for the passengers seated in the rear since the backrest can yield progressively under load. Preferably, the backrest is yieldingly supported by rubber thrust springs arranged in the pivot axis thereof whereby the locking mechanism engages in the backrest fittings thereof at a distance therefrom. The simple construction of the seat frame with a spatially favorable arrangement of the spring elements is safeguarded thereby and a safe support of the backrest is also achieved thereby. If rubber thrust springs are used for the spring support of the backrest, which consist of two sleeves disposed eccentrically with respect to each other between which is arranged a pre-tensioned rubber segment, then a large spring path may be achieved with small dimensions if the outer sleeve is connected with one end of the backrest fitting whereas the inner sleeve is rotatably supported on the pivot bolt of the backrest support. Simultaneously therewith, the spring elements of the backrest do not oppose any resistance during forward tilting if the locking mechanism is disengaged. The usual handling of the backrest, for example, during boarding of passengers into the rear seat is also safeguarded thereby.

The locking mechanism consists for reasons of simplicity of a two-armed locking lever subjected to a spring tension and provided with a detent projection or nose portion which is in engagement with a stationary abutment of the seat frame. Advantageously, an adjusting mechanism is arranged between the pivot axis of the backrest and that of the locking lever which adjusting mechanism cooperates with the abutment of the locking lever. The adjusting mechanism serves for purposes of adjusting the locking members connected with the backrest fitting or fixture relative to the engaging members of the seat frame. Simultaneously therewith, the pre-tension of the spring element may be adjusted by this installation. The adjusting mechanism consists of an adjusting screw retained in the backrest fitting or fixture, the head part of the adjusting screw being supported by the intermediary of an elastic insert at the abutment of the locking lever whereby an equalization and compensation for manufacturing and/or assembly inaccuracies may be readily carried out.

Accordingly, it is an object of the present invention to provide a tiltable backrest for vehicle seats which avoids the shortcomings and drawbacks encountered with the prior art constructions in a simple and reliable manner.

It is another object of the present invention to provide a locking mechanism for tiltable backrests of vehicle seats which prevents permanent deformation in case of accidents to the seat frame and therewith reduces considerably the cost of repair in case of collision.

Still another object of the present invention resides in the provision of a backrest for vehicle seats in which shocks acting thereon are dampingly absorbed in such a manner that damages to the seat frame and backrest support are avoided in a far-reaching manner if not eliminated altogether.

Still a further object of the present invention resides in the provision of a locking mechanism for the tiltable backrest of a vehicle seat which increases the safety to the passengers seated in the back by reason of its progressive yieldingness under load.

A further object of the present invention resides in the provision of a locking mechanism for a tiltable backrest of a motor vehicle seat which not only avails normal use thereof, for example, during boarding of rear seat passengers, but also maintains a spatially favorable arrangement of the various elements forming part of the mechanism.

Still a further object of the present invention resides in the provision of a locking mechanism for tiltable backrests of motor vehicle seats which produces a safe support of the backrest on the seat frame.

Another object of the present invention resides in the provision of a disengageable locking mechanism for tiltable backrests of vehicle seats in which an adjusting mechanism is provided that permits, by simple means, not only to adjust the relative positions of the engaging members to the engaged parts but also permits simple compensation for manufacturing and assembly inaccuracies.

These and other objects, features and advantages of the present invention will become more obvious from the following description when taken in connection with the accompanying drawing which shows, for purposes of illustration only, one embodiment in accordance with the present invention, and wherein—

FIGURE 1 is a partial side elevational view of a seat structure and fitting thereof of a passenger motor vehicle provided with support and locking means of the backrest in accordance with the present invention, certain parts thereof being shown in cross section to indicate the details thereof;

FIGURE 2 is a partial cross sectional view taken along II—II of FIGURE 1, and

FIGURE 3 is a partial cross sectional view taken along line III—III of FIGURE 1.

Referring now to the drawing wherein like reference numerals are used throughout the various views to designate like parts, the vehicle seat shown therein consists of a seat portion 1 and of a backrest 2 which is tiltably secured at the seat portion 1 about an axis of rotation X—X (FIGURE 2) and is provided for that purpose on each side thereof with a fixture or fitting 4. The seat portion 1 comprises a seating shell 4 consisting of a stamped or pressed sheet metal part provided with angularly-bent reinforcing rims 5 at which is arranged a seat rail 6. The counterpart 7 of the seat rail 6 is secured at the center bearer member 8 of the vehicle floor 9 by means of screws or bolts 10. A U-shaped bracket 11 is connected with the reinforcing rim 5 of the seat shell 4 opposite the seat rail 6, and a bolt 12 is retained within the bracket 11 within the axis of rotation X—X. The backrest fitting or fixture 3 is pivotally secured on the bolt 12 by the interposition of a rubber thrust spring 13. The rubber thrust spring 13 consists of an outer sleeve 14 and of an inner sleeve 15 which are displaced eccentrically with respect to each other and are connected with each other by a rubber segment 16 which contains the recesses 17 and 18. The outer sleeve 14 of the rubber thrust spring 13 is rigidly connected with one end of the backrest fitting 3 whereas the inner sleeve 15 is emplaced rotatably on the bolt 12. The rubber thrust spring 13 is retained in the axial direction with the use of a guard plate or disk 20 by a screw 19 inserted into the bolt 12.

A locking mechanism 22 is arranged at the backrest fitting 3 near the rear edge 21 of the seat portion 1 at a distance from the axis of rotation X—X. The locking mechanism 22 consists of a two-armed locking lever generally designated by reference numeral 23 provided with a handle 24 which projects beyond the contours of the seat. The locking lever 23 is pivotally arranged about a bolt 25 at a support 26 itself connected in any suitable manner with the backrest fitting 3. The shorter arm 27 of the locking lever 23 is provided with a detent projection 28 whereas the longer arm 29 is pre-tensioned against an angular abutment member 31 by the effect of a cock spring 30 supported within the fitting or fixture 3. The spring 30 maintains the form-locking connection of the engaging portion 28 with the abutment 32 secured at the seat shell 4.

An adjusting mechanism generally designated by reference numeral 33 is arranged at the height of the abutment 32 between the axis of rotation X—X and the bolt 25 of the locking lever 23 which adjusting mechanism 33 serves for purposes of adjusting the locked position of the backrest 2. The adjusting mechanism 33 consists of a screw 34 retained within the backrest fitting 3 the position of which is assured by a counternut 35. The head portion 36 of the adjusting screw 34 abuts by the intermediary of an elastic insert 37 against the abutment 32. The insert 37 is adhesively connected with or secured to the abutment 32 in any suitable manner.

*Operation*

The operation of the locking mechanism for the backrest in accordance with the present invention is as follows:

If the vehicle is suddenly braked with the backrest 2 in the normal use position thereof as shown in FIGURE 1, and the passengers seated in the rear are thrown thereby against the backrest 2 as a result of the inertial force, then the impact force thus introduced is absorbed via the fittings or fixtures 3 by the rubber thrust springs 13. Depending on the magnitude of the introduced force, the outer sleeve 14 of the rubber thrust spring 13 connected with the fitting 3 is displaced thereby with simultaneous rotation to a greater or lesser extent in the counter rotational direction with respect to the inner sleeve 15 whereby the nose portion or engaging detent 28 of the locking lever 23 serves as fixed point of the backrest support. By reason of the counter rotating movement of the two sleeve bodies 14 and 15 which enclose therebetween the rubber torsion spring 16, a rapidly progressive reduction of the impact forces is achieved thereby and therewith the passengers are safeguarded against bodily damage. Simultaneously therewith, the backrest support is relieved in a far-reaching manner of the introduced impact force so that no deformations occur at the seat frame. When the introduced impact-force is reduced by the rubber thrust spring 13, then the outer sleeve 14 returns to its initial position.

If the backrest 2 is to be tilted forwardly against the seat portion 1, for example, during boarding of passengers, then at first the locking mechanism 22 is to be disengaged by pressing the locking lever 23 at the handle 24 thereof against the effect of the spring 30 away from its abutment 31. The detent nose portion 28 of the locking lever 23 is thereby disengaged from the abutment 32 at the seat shell 4. The backrest 2 can now be tilted forwardly about the axis of rotation X—X. The rubber thrust spring 13 produces no opposition during this operation to the pivot movement by reason of the rotatable support of the inner sleeve 15 on the bolt 12 so that the normal handling of the backrest is maintained.

While I have shown and described one embodiment in accordance with the present invention, it is understood that the same is not limited thereto, but is susceptible of many changes and modifications within the spirit and scope thereof. For example, the present invention is also suitable for seating benches having split or separate backrest halves which are adapted to be tilted forwardly independently of one another. Additionally, in place of an adjusting mechanism for the locking lever of the locking mechanism, a locally fixed abutment may be provided if this is so desired for cost reasons.

Thus, it is clear that the present invention may be varied at will within the scope of a person skilled in the art, and I therefore do not wish to be limited to the details shown and described herein, but intended to cover all such changes and modifications as are encompassed by the scope of the appended claims.

I claim:

1. A vehicle seat comprising seat frame means, tiltable backrest means, disengageable locking means tiltably supporting said brackrest means at said seat frame means in the normal position thereof to prevent unintentional forward tilting of said backrest means, and resilient means for providing a spring resistance to shocks acting against said backrest means and supporting said backrest means at said seat frame means and effective essentially exclusively with said backrest means in the normal position of use thereof.

2. A vehicle seat comprising seat frame means, tiltable backrest means tiltable about a tilting axis and including fixture means, disengageable locking means securing said backrest means at said seat frame means in the normal position thereof to prevent unintentional forward tilting of said backrest means, and rubber thrust spring means for providing a spring resistance to shocks acting against said backrest means and supporting said backrest means at said seat frame means and effective essentially exclusively with said backrest means in the normal position of use thereof, said rubber thrust spring means being arranged in the tilting axis of said backrest means, and said locking means engaging with said fixture means at a distance from said tilting axis.

3. A vehicle seat comprising seat frame means, backrest means adapted to be tilted about a tilting axis, disengageable locking means securing said backrest means at said seat frame means in the normal position of use thereof to prevent unintentional forward tilting of said backrest means, and means for tiltably securing said backrest means to said seat frame means including a pivot bolt secured to said frame means, fixture means secured to said backrest means, and rubber thrust spring means for providing a spring resistance to shocks acting against said backrest means and supporting said backrest means at said seat frame means and effective essentially exclusively when said backrest means is in said normal position of use thereof, said rubber thrust spring means being arranged in the tilting axis of said backrest means and consisting of two eccentrically disposed sleeves enclosing therebetween a pre-stressed rubber segment, the outer one of said sleeves being secured to one end of said backrest fixture means while the inner one of said sleeves is rotatably mounted over said pivot bolt, said locking means being secured to said fixture means at a distance from said tilting axis.

4. A vehicle seat comprising seat frame means, backrest means adapted to be tilted about a tilting axis, disengageable locking means securing said backrest means at said seat frame means in the normal position of use thereof to prevent unintentional forward tilting of said backrest means, and means for tiltably securing said backrest means to said seat frame means including a pivot bolt secured to said frame means, fixture means secured to said backrest means, rubber thrust spring means for providing a spring resistance to shocks against said backrest means and supporting said backrest means at said seat frame means and effective essentially exclusively with said backrest means in the normal position of use thereof, said rubber thrust spring means being arranged in the tilting axis of said backrest means and consisting of two eccentrically disposed sleeves enclosing therebetween a pre-stressed rubber segment, the outer one of said sleeves being secured to one end of said backrest fixture means while the inner one of said sleeves is rotatably mounted over said pivot bolt, said locking means including a lever means secured to said fixture means at a distance from said tilting axis, and adjusting means located between said tilting axis and said lever means and cooperating with an abutment means, said abutment means having an elastic means thereon, said adjusting means including a threadable adjusting member retained within said fixture means and having a head portion resting against said elastic means of the abutment means when said backrest means is in the normal position of use thereof.

5. A vehicle seat as defined in claim 4, wherein said disengageable locking means includes a spring-loaded two-armed lever means having a nose portion operative to engage with said abutment means.

6. A vehicle seat comprising seat frame means, backrest means adapted to tilt about a tilting axis, disengageable locking means securing said backrest means at said seat frame means in the normal position of use thereof to prevent unintentional forward tilting of said backrest means, and support means for securing said backrest means to said seat frame means including spring means supporting said backrest means at said seat frame means for providing a spring resistance to shocks acting against said backrest means when said backrest means is in the normal position of use thereof and with said disengageable locking means rendered effectual and for permitting unimpaired tilting of said backrest means about said tilting axis when said locking means is disengaged.

7. In a vehicle seat having seat frame means, backrest means adapted to tilt about a tilting axis, support means supporting said backrest means at said seat frame means, and disengageable locking means for securing said backrest means at said seat frame means in the normal position of use thereof to prevent unintentional forward tilting of said backrest means, the improvement essentially consisting of elastic means in said support means for tiltably supporting said backrest means and operative to dampeningly absorb impact forces introduced into said backrest means which tend to tilt the latter in a forward direction essentially exclusively when said backrest means is in the normal position of use thereof and with said disengageable locking means in the engaged position thereof.

8. In a vehicle seat having seat frame means, backrest means adapted to tilt about a tilting axis, support means supporting said backrest means at said seat frame means, and disengageable locking means for securing said backrest means at said seat frame means in the normal position of use thereof to prevent unintentional forward tilting of said backrest means, the improvement essentially consisting of elastic means in said support means for tiltably supporting said backrest means and operative to dampeningly absorb impact forces introduced into said backrest means which tend to tilt the latter in a forward direction essentially exclusively when said backrest means is in the normal position of use thereof and with said disengageable locking means in the engaged position thereof, said elastic means being constituted by rubber thrust springs disposed in the tilting axis of said backrest means and consisting of two eccentrically disposed sleeves enclosing therebetween a pre-stressed rubber segment, the outer one of said sleeves being secured to said backrest means, the inner one of said sleeves being rotatably mounted over a pivot bolt provided in said support means.

References Cited in the file of this patent

UNITED STATES PATENTS

| | | |
|---|---|---|
| 1,409,781 | Rimailho | Mar. 14, 1922 |
| 2,559,548 | Seignor | July 3, 1951 |
| 2,621,923 | Krotz | Dec. 16, 1952 |
| 2,985,227 | Leja | May 23, 1961 |
| 3,028,198 | Murr | Apr. 3, 1962 |